(12) United States Patent
Bassill et al.

(10) Patent No.: US 11,483,903 B2
(45) Date of Patent: Oct. 25, 2022

(54) MULTI-COIL INDUCTION WARMING SYSTEM

(71) Applicant: HATCO CORPORATION, Milwaukee, WI (US)

(72) Inventors: Nick Bassill, Milwaukee, WI (US); Fei Shang, Milwaukee, WI (US); Ishan Shah, Milwaukee, WI (US)

(73) Assignee: HATCO CORPORATION, Milwaukee, WI (US)

( * ) Notice: Subject to any disclaimer, the term of this patent is extended or adjusted under 35 U.S.C. 154(b) by 538 days.

(21) Appl. No.: 16/416,111

(22) Filed: May 17, 2019

(65) Prior Publication Data
US 2019/0357321 A1 Nov. 21, 2019

Related U.S. Application Data

(60) Provisional application No. 62/673,772, filed on May 18, 2018, provisional application No. 62/673,775, (Continued)

(51) Int. Cl.
*H05B 6/06* (2006.01)
*H05B 6/12* (2006.01)
(Continued)

(52) U.S. Cl.
CPC .......... *H05B 6/065* (2013.01); *H05B 6/1245* (2013.01); *H05B 6/365* (2013.01); *H05B 6/44* (2013.01)

(58) Field of Classification Search
CPC ...................... H05B 2213/03; H05B 2213/07; H05B 6/065; H05B 6/1245; H05B 6/1272; H05B 6/365; H05B 6/44; Y02B 40/00
(Continued)

(56) References Cited

U.S. PATENT DOCUMENTS 3,632,983 A 1/1972 Dills
4,363,956 A 12/1982 Scheidler et al.
(Continued)

FOREIGN PATENT DOCUMENTS

DE 10 2005 058 505 A1 6/2007
DE 10 2015 201 079 A1 9/2015
(Continued)

*Primary Examiner* — Quang T Van
(74) *Attorney, Agent, or Firm* — Foley & Lardner LLP

(57) ABSTRACT

An induction heating system includes a power inverter, an induction circuit, and a control circuit. The power inverter includes one or more transistors configured to receive a direct current (DC) input and produce an alternating current (AC) output. The induction circuit includes at least one working coil configured to receive the AC output and produce a first magnetic field, wherein the first magnetic field interacts with a ferrous material to generate heat in the ferrous material. The control circuit includes a processor and memory. The memory having instructions stored thereon that, when executed by the processor, cause the control circuit to receive an input, from a user, indicating a temperature set point, measure an inductance of the induction circuit, determine a resonant frequency of the induction circuit based on the inductance, and control the one or more transistors of the power inverter based on the resonant frequency and the temperature set point.

6 Claims, 12 Drawing Sheets

Related U.S. Application Data filed on May 18, 2018, provisional application No. 62/673,769, filed on May 18, 2018.

(51) Int. Cl.
  *H05B 6/44* (2006.01)
  *H05B 6/36* (2006.01)

(58) Field of Classification Search
  USPC ....... 219/626, 618, 620, 622, 625, 627, 660, 219/661, 663, 665; 363/49, 21
  See application file for complete search history.

(56) References Cited

U.S. PATENT DOCUMENTS

| | | | |
|---|---|---|---|
| 6,436,796 B1 * | 8/2002 | Mailho | C23C 16/46 438/758 |
| 6,736,901 B2 * | 5/2004 | Nishibayashi | C23C 16/46 118/712 |
| 8,124,200 B2 | 2/2012 | Quella et al. | |
| 8,269,149 B2 * | 9/2012 | Acero Acero | H05B 6/1272 219/622 |
| 8,968,848 B2 | 3/2015 | Quella et al. | |
| 10,582,573 B2 | 3/2020 | Hoare et al. | |
| 11,156,364 B2 | 10/2021 | Yang | |
| 2002/0125245 A1 | 9/2002 | Fuchs | |
| 2009/0057298 A1 | 3/2009 | Komma | |
| 2012/0063799 A1 * | 3/2012 | Ueno | G03G 15/2039 219/661 |
| 2013/0037535 A1 * | 2/2013 | Ogasawara | H05B 6/062 219/622 |
| 2013/0140297 A1 | 6/2013 | Okuda et al. | |
| 2015/0008755 A1 * | 1/2015 | Sone | H02J 50/80 307/104 |
| 2016/0014849 A1 | 1/2016 | Hegedis et al. | |
| 2019/0029081 A1 * | 1/2019 | Nam | G05F 1/153 |
| 2020/0010332 A1 | 1/2020 | Lang | |

FOREIGN PATENT DOCUMENTS

| | | |
|---|---|---|
| GB | 2 552 531 | 1/2018 |
| JP | 02114488 A * | 4/1990 |
| JP | 2002083674 A * | 3/2002 |
| KR | 20110076166 A | 7/2011 |

* cited by examiner

MULTI-COIL INDUCTION WARMING SYSTEM

CROSS-REFERENCE TO RELATED PATENT APPLICATIONS

This application (a) claims the benefit of U.S. Provisional Patent Application No. 62/673,769, filed May 18, 2018, U.S. Provisional Patent Application No. 62/673,772, filed May 18, 2018, and U.S. Provisional Patent Application No. 62/673,775, filed May 18, 2018, and (b) is related to (i) U.S. patent application Ser. No. 16/415,938, filed May 17, 2019, which claims the benefit of U.S. Provisional Patent Application No. 62/673,762, filed May 18, 2018, (ii) U.S. patent application Ser. No. 16/415,943, filed May 17, 2019, which claims the benefit of U.S. Provisional Patent Application No. 62/673,781, filed May 18, 2018, and U.S. Provisional Patent Application No. 62/673,785, filed May 18, 2018, and (iii) U.S. patent application Ser. No. 16/416,124, filed May 17, 2019, which claims the benefit of U.S. Provisional Patent Application No. 62/673,763, filed May 18, 2018, U.S. Provisional Patent Application No. 62/673,768, filed May 18, 2018, U.S. Provisional Patent Application No. 62/673,778, filed May 18, 2018, and U.S. Provisional Patent Application No. 62/673,780, filed May 18, 2018, all of which are incorporated herein by reference in their entireties.

BACKGROUND

Induction warmers and cookers are an alternative to traditional thermal conduction cooking surfaces (e.g., gas stoves). Traditional thermal conduction cooking surfaces produce a heat source (e.g., a flame) that heats a cooking vessel. However, with induction warmers and cookers the cooking vessel is the heat source itself. Induction warmers and cookers use one or more induction coils to heat an inductive cooking vessel. A power inverter powers an inductive coil, referred to as a working coil, to generate an oscillating magnetic field. The oscillating magnetic field induces an eddy current in the ferrous cooking vessel. The ferrous cooking vessel acts as a resistance to the induced eddy current. The resistance to the induced eddy current produces heat in the cooking vessel.

SUMMARY

One embodiment relates to an induction heating system including a power inverter including one or more transistors configured to receive a direct current (DC) input and produce an alternating current (AC) output, an induction circuit including at least two working coils configured to receive the AC output and produce a magnetic field, wherein the magnetic field interacts with a ferrous material to generate heat in the ferrous material, and a control circuit. The control circuit including a processor and memory coupled to the processor, the memory having instructions stored thereon that, when executed by the processor, cause the control circuit to receive an input, from a user, indicating a temperature set point, measure an inductance of the induction circuit, determine a resonant frequency of the induction circuit based on the inductance, and control the one or more transistors of the power inverter based on the resonant frequency and the temperature set point.

In some embodiments, the induction circuit is a tank circuit, the tank circuit including at least one capacitor and the at least two working coils. In some embodiments, the tank circuit is a series tank circuit, wherein the at least one capacitor is in series with the at least two working coils. In some embodiments, the at least two working coils are arranged in a parallel combination, wherein the parallel combination is arranged in series with the at least one capacitor. In some embodiments, the parallel combination includes a variable resistor, wherein the variable resistor changes between a first resistance and second resistance. In some embodiments, the tank circuit includes a first branch and a second branch, the first branch includes a first working coil powered by a first power inverter, the second branch powered by a second power inverter and including one or more series sets of one or more series working coils positioned around the first working coil of the first branch. In some embodiments, the induction heating system further includes a surface to hold a cooking vessel, wherein the at least two working coils are configured to move between a first position and a second position, the first position located at a first vertical height and the second position located at a second vertical height. In some embodiments, the induction circuit, the control circuit, and the power inverter are positioned within one or more housings, each of the one or more housings having a top, wherein the top includes at least one of stone, porcelain, glass, ceramic, metal, or metal alloy.

Another embodiment relates to an induction heating system including a power inverter including one or more transistors configured to receive a direct current (DC) input and produce an alternating current (AC) output, an induction circuit including a first group and a second group, wherein the first group including a working coil and the second group includes a number of working coils positioned around the working coil of the first group, and wherein the induction circuit is configured to receive the AC output and produce a number of magnetic fields, wherein the number of magnetic fields interact with a ferrous material to generate heat in the ferrous material, and a control circuit including a processor and memory coupled to the processor, the memory having instructions stored thereon that, when executed by the processor, cause the control circuit to receive an input, from a user, indicating a temperature set point, measure an inductance of the induction circuit, determine a resonant frequency of the induction circuit based on the inductance, and control the one or more transistors of the power inverter based on the resonant frequency and the temperature set point.

In some embodiments, the induction circuit is a tank circuit, the tank circuit including at least one capacitor and the number of working coils. In some embodiments, the tank circuit is a series tank circuit including the at least one capacitor in series with the number of working coils. In some embodiments, the tank circuit is a parallel tank circuit including the at least one capacitor in parallel with the number of working coils. In some embodiments, the tank circuit includes a parallel combination of the number of working coils. In some embodiments, the parallel combination of the number of working coils includes a variable resistor, wherein the variable resistor changes between a first resistance and second resistance. In some embodiments, the first group is powered by a first power inverter and the second group is powered by one or more second power inverters.

Another embodiment relates to a method of controlling an induction heating system including receiving, via a control circuit, a user input indicating at least one of a temperature set point or a power set point, measuring, via the control circuit, an inductance of an induction circuit, the induction circuit including a number of working coils, each working coil configured to receive an alternating current (AC) input and produce at least one magnetic field, determining, via the control circuit, a resonant frequency of the induction circuit, and controlling, via the control circuit, one or more transistors of a power inverter to produce the AC input for the induction circuit, wherein the AC input powers the number of working coils.

In some embodiments, the method further including determining, via one or more sensors, a presence of a cooking vessel. In some embodiments, the induction circuit is a tank circuit, the tank circuit including at least one capacitor and the number of working coils. In some embodiments, the tank circuit is a series tank circuit including the at least one capacitor in series with the number of working coils, and wherein the tank circuit includes a variable resistor, the method further including changing, via the control circuit, the variable resistor from a first resistance to a second resistance. In some embodiments, the tank circuit is a parallel tank circuit including the at least one capacitor in parallel with the number of working coils.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Figure 1:
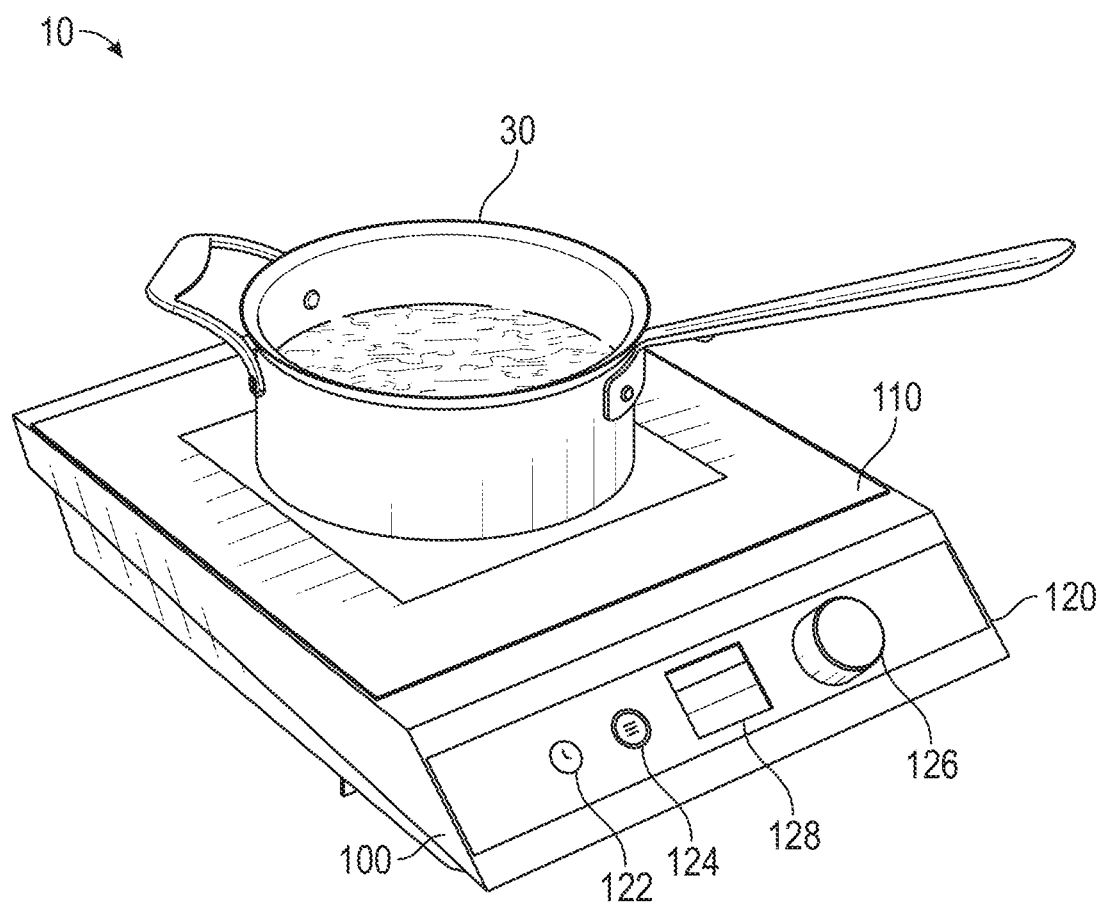
FIG. 1 is a perspective view of an inductive warmer/cooker, according to an exemplary embodiment.

FIG. 1 shows an inductive heating system 10, according to an exemplary embodiment. The inductive heating system 10 includes inductive warmer/cooker 100. Inductive warmer/cooker 100 produces a magnetic field to heat a cooking vessel, shown as pot 30. Inductive warmer/cooker 100 may be used in residential and commercial kitchens, food-carts, buffets, and/or any other place where food warming/cooking is required. Inductive warmer/cooker 100 includes heating/cooking surface 110 and user interface 120.

Figure 13:
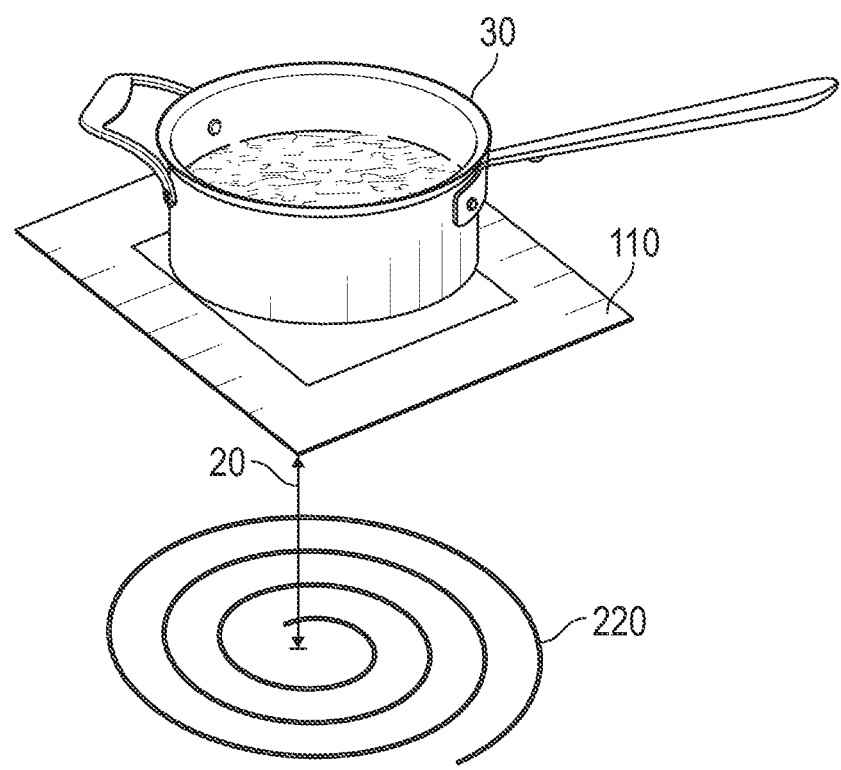
FIG. 13 is the inductive warmer/cooker of FIG. 1 having a variable cooking surface distance, according to an exemplary embodiment.

Surface 110 holds the pot 30 sufficiently within the magnetic field created by inductive warmer/cooker 100. Surface 110 may be made of ceramic, glass, metal, and/or any other material or composite. In some embodiments, surface 110 includes one or more markings to indicate optimal placement of the pot 30. For example, surface 110 may include a circular outline of a pot. In some embodiments, surface 110 is a substantially flat surface, as shown in FIG. 1. In some embodiments, surface 110 includes a grate, hot plate, potholder, or other cooking vessel support. Additionally or alternatively, surface 110 may include a well or other structure to hold a chafing pan or other serving vessel. For example, a sleeve may fit around the perimeter of surface 110 to receive a chafing pan and hold the chafing pan above the surface 110. In some embodiments, surface 110 is configured to be adjustable to change a height of pot 30 relative to the magnetic field, as shown in FIG. 13. Additionally or alternatively, induction circuit 130 and/or working coil 220 may be adjusted to change a position relative to the surface 110 thereby changing the magnetic field relative to the pot 30. The position of pot 30 relative to the magnetic field changes the effect of the magnetic field on the pot 30, thereby controlling the amount of heat produced by the pot 30.

User interface 120 includes a number of controls 122-126. Controls 122-126 allow a user to control the operation of inductive warmer/cooker 100. For example, a user may set a temperature of the pot 30 and/or a timer to control a duration of heating. User interface 120 is shown to include display 128, according to the exemplary embodiment. Display 128 may present information to the user about operation of the inductive warmer/cooker 100. For example, display 128 may display a current temperature set point of the pot 30. In some embodiments, display 128 is a touchscreen display and can serve as another source of user input for inductive warmer/cooker 100. Display 128 may be an electroluminescent (ELD) display, a liquid crystal (LCD) display, a light-emitting diode (LED) display, an organic light-emitting diode (OLED) display, a plasma (PDP) display, a quantum dot (QLED) display, and/or any other display known in the art.

Figure 2:
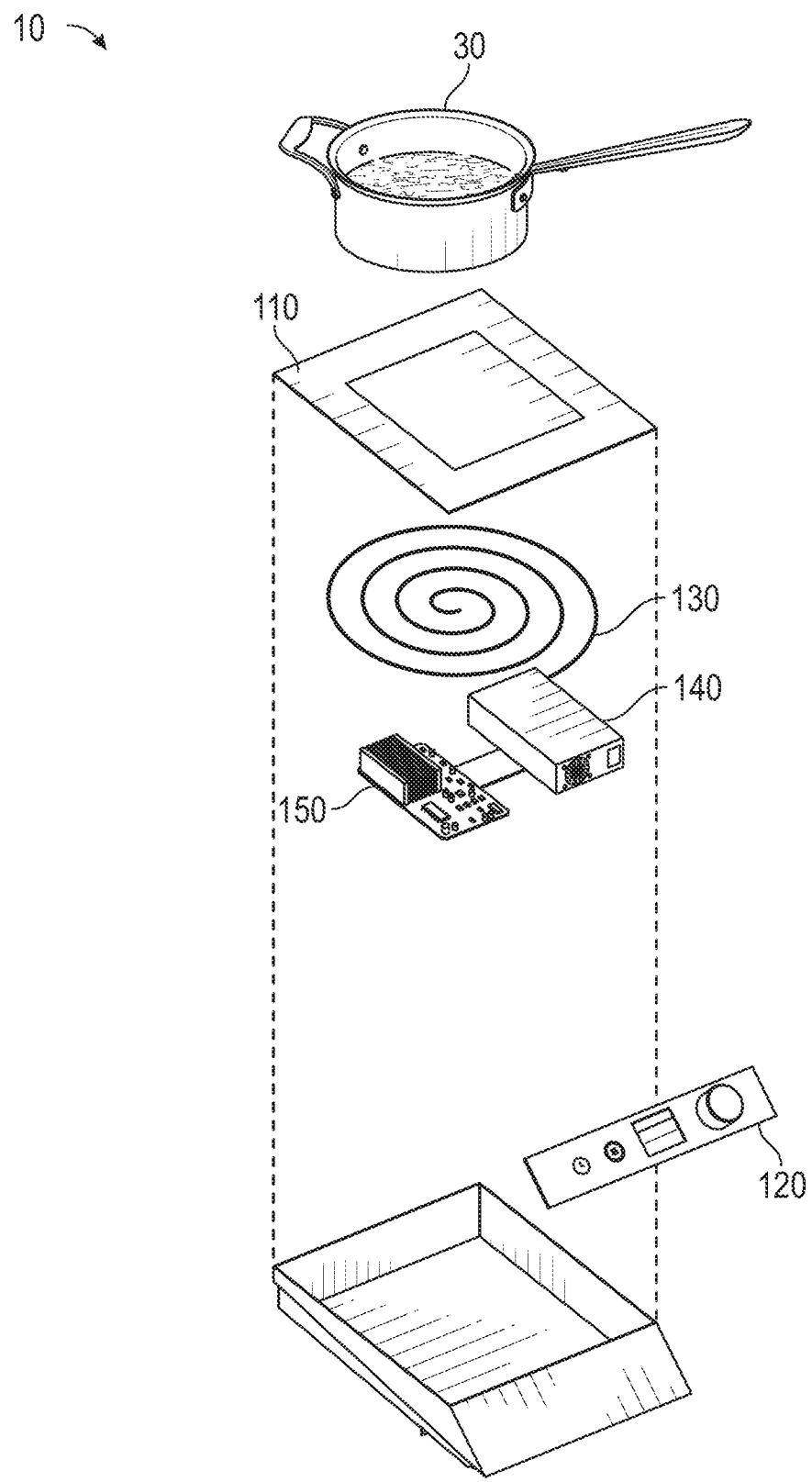
FIG. 2 is an exploded view of the inductive warmer/cooker of FIG. 1, according to an exemplary embodiment.

Referring now to FIG. 2, an exploded view of the inductive heating system 10 is shown, according to an exemplary embodiment. Inductive warmer/cooker 100 is shown to include induction circuit 130, power inverter 140, and control circuit 150. Induction circuit 130 receives power from power inverter 140 to produce an oscillating magnetic field in the vicinity of surface 110. The oscillating magnetic field produces eddy currents in the pot 30 that dissipate as heat, thereby heating the pot 30.

Figure 2A:
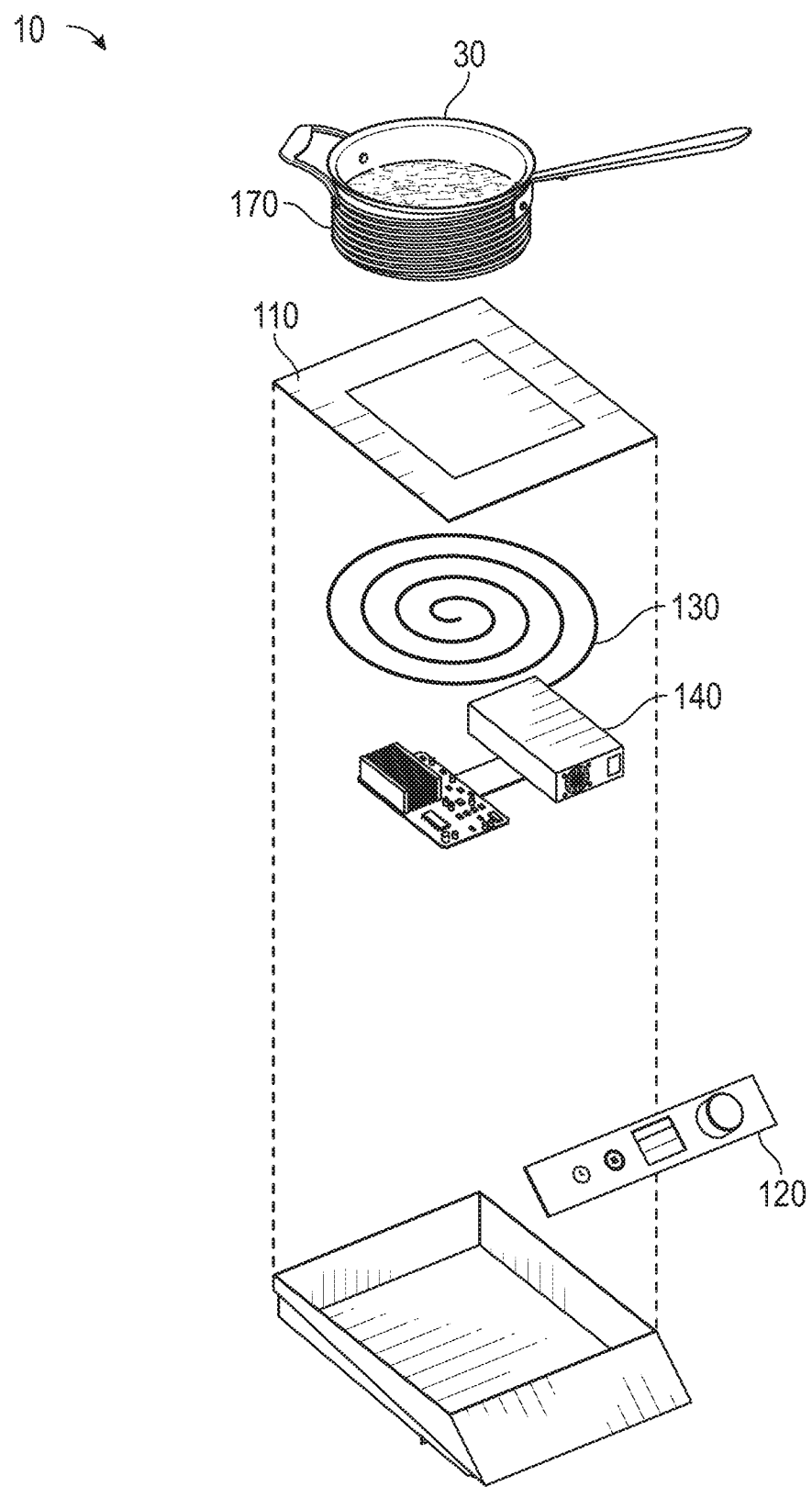
FIG. 2A is the inductive warmer/cooker of FIG. 1 having an inductive heating blanket, according to an exemplary embodiment.

Referring now to FIG. 2A, in some embodiments inductive heating system 10 includes a heating element, shown as heating blanket 170. Heating blanket 170 may include a wire coil to receive the magnetic field produced by inductive warmer/cooker 100, thereby heating the heating blanket 170. In some embodiments, heating blanket 170 is positioned to at least partially surround the pot 30, thereby heating the pot 30. Some cooking vessels do not interact with a magnetic field efficiently. For example, a copper pot requires much larger magnetic field strengths to heat the pot than that of a cast iron pot. Accordingly, heating blanket 170 may be used with cooking vessels that are non-ferrous and/or are made of materials that do not meaningfully interact with a magnetic field. For example, the heating blanket 170 may be used to heat an aluminum pot that otherwise would not be easily heated by the inductive warmer/cooker 100. In some embodiments, heating blanket 170 takes another form such as a steel disc. A steel disc may receive the magnetic fields produced by inductive warmer/cooker 100 and thereby function as a hotplate to heat cooking vessels that otherwise would not be easily heated by the inductive warmer/cooker 100. Heating blanket 170 may allow the inductive warmer/cooker 100 to operate at lower powers by receiving the magnetic field and heating the pot 30 more efficiently than a non-ferrous material such as an aluminum pot is able to heat itself.

Figure 3:
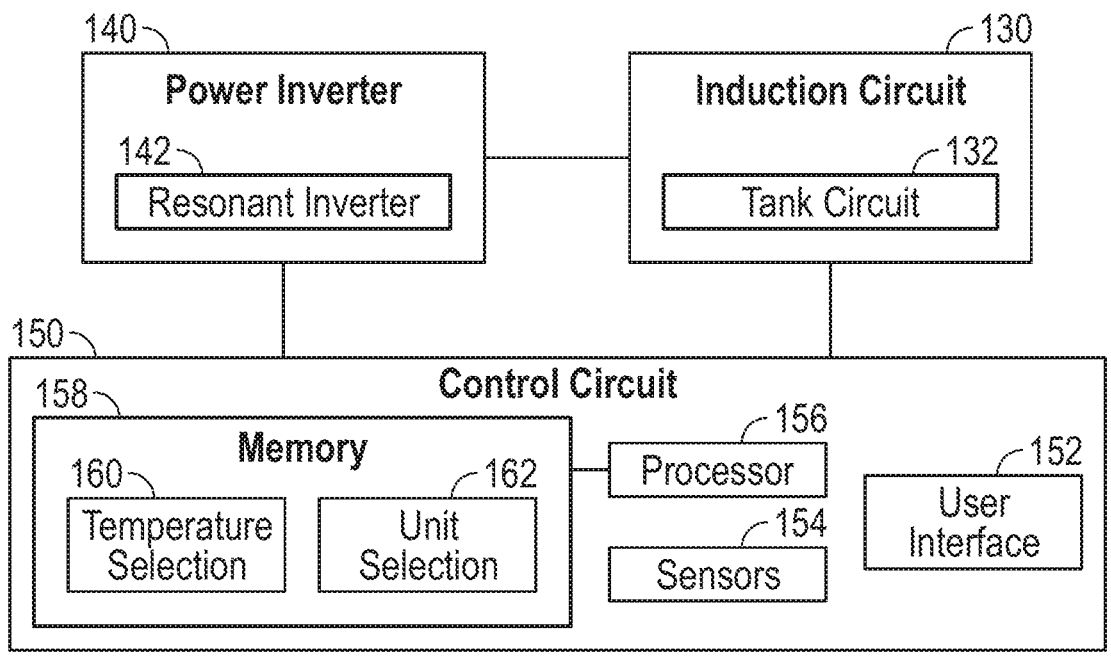
FIG. 3 is a block diagram of the inductive warmer/cooker of FIG. 1, according to an exemplary embodiment.

Referring now to FIG. 3, a block diagram of the inductive warmer/cooker 100 is shown, according to an exemplary embodiment. In various embodiments, induction circuit 130 includes tank circuit 132. Speaking generally, a tank circuit is a combination of a capacitor and an inductor. Tank circuit 132 is an electrical resonator and may act as a source of the magnetic field to heat the pot 30. In some embodiments, induction circuit 130 includes a different type, layout, or design of induction circuit. For example, induction circuit 130 could include a Royer oscillator. The tank circuit 132 is discussed in detail below with reference to FIGS. 4-10.

In various embodiments, power inverter 140 includes resonant inverter 142. Resonant inverter 142 receives direct current (DC) input and produces alternating current (AC) output. In some embodiments, resonant inverter 142 is a full-bridge inverter, as discussed in detail with reference to FIG. 11. Additionally or alternatively, power inverter 140 may include a different type, layout, or design of inverter. For example, power inverter 140 may include a current source inverter, and/or a half-bridge inverter. In some embodiments, power inverter 140 includes an AC/AC converter.

Control circuit 150 includes user interface 152, sensors 154, processor 156, and memory 158. Control circuit 150 may be coupled to and control induction circuit 130 and/or power inverter 140. For example, control circuit 150 may determine a resonant frequency of induction circuit 130 and control power inverter 140 to produce an AC signal at the resonant frequency. Additionally or alternatively, control circuit 150 may receive user input (e.g., via user interface 152) and control operation of the induction warmer/cooker 100 based on the user input. For example, control circuit 150 may receive a temperature set point via user interface 152 and control power inverter 140 to produce an output voltage to achieve the desired temperature set point.

User interface 152 may receive inputs from a user and/or display information to a user. For example, user interface 152 may include controls 122-126, as described above with reference to FIG. 1, to receive a temperature set point from a user. Additionally or alternatively, user interface 152 may include a display interface, such as display 128 as described above with reference to FIG. 1. The user interface 152 may be coupled to or at least partially integrated with user interface 120.

Sensors 154 may include one or more sensors to measure operation of the inductive warmer/cooker 100. For example, sensors 154 may include a current sensor to detect an output current of resonant invert 142. Additionally or alternatively, sensors 154 may include a temperature sensor (e.g., thermistor) to determine a temperature of the pot 30. In some embodiments, sensors 154 include a load detection circuit and/or a resonant frequency detection circuit to measure operation of the induction circuit 130 in response to changes in load (e.g., adding or removing a pot 30 from the surface 110). Furthermore, in some embodiments, sensors 154 include a sensor (e.g., current sensor, infrared (IR) sensor, etc.) positioned to detect the presence of pot 30. For example, a current sensor may measure the load of induction circuit 130 to determine the presence of pot 30.

Processor 156 can be implemented as a general purpose processor, an application specific integrated circuit (ASIC), one or more field programmable gate arrays (FPGAs), a group of processing components, or other suitable electronic processing components.

Memory 158 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 158 can be or include volatile memory or non-volatile memory. Memory 158 can include database components, object code components, script components, or any other type of information structure for supporting the various activities and information structures described in the present application. According to an exemplary embodiment, memory 158 is communicably connected to processor 156 via control circuit 150 and includes computer code for executing (e.g., by control circuit 150 and/or processor 156) one or more processes described herein.

Memory 158 includes temperature selection 160 and unit selection 162. Temperature selection 160 may receive a temperature set point (e.g., via user interface 152) and adjust induction circuit 130 and/or power inverter 140 to achieve the temperature set point. For example, temperature selection 160 may receive a temperature set point that is 5° F. higher than the induction warmer/cooker 100 is currently operating at and adjust the power inverter 140 to output a larger current to increase the magnetic field produced by the induction circuit 130, thereby increasing the temperature of the pot 30 by 5° F. Additionally or alternatively, temperature selection 160 may receive an indication of a change in load (e.g., via sensors 154) and adjust induction circuit 130 and/or power inverter 140 to maintain a temperature set point.

Unit selection 162 may receive a selection of a portion of the surface 110 of the induction warmer/cooker 100 and adjust induction circuit 130 and/or power inverter 140 to produce a magnetic field at the selected portion. For example, a user may indicate a rearward-left portion of the surface 110 using control 126 and unit selection 162 may adjust the power inverter 140 to deliver power to an induction coil located in the rearward-left portion of the induction warmer/cooker 100.

Turning now to FIGS. 4-10, various embodiments of the tank circuit 132 are shown. Although FIGS. 4-10 are described in reference to series inductive/capacitive circuits, it should be understood that parallel inductive/capacitive circuits are also possible and within the scope of the present disclosure. Furthermore, it should be understood that any series inductive/capacitive circuit equation referenced in the discussion of FIGS. 4-10 may be substituted for a parallel inductive/capacitive circuit equation alternative. The tank circuit 132 includes inductors L, and capacitors C.

Tank circuit 132 includes an AC power source 200. AC power source 200 provides a source of AC excitation to the tank circuit 132. AC power source 200 may be resonant inverter 142 described in detail with reference to FIG. 11. In some embodiments, AC power source 200 is another power source altogether. In some embodiments, tank circuit 132 receives power from a single AC power source 200. Additionally or alternatively, tank circuit 132 may receive power from multiple AC power sources 200. In some embodiments, multiple tank circuits 132 are powered by multiple AC power sources 200 in one or more groups. For example, a first resonant inverter 142 may power a first tank circuit 132 and a second resonant inverter 142 may power a second tank circuit 132. Tank circuit 132 further includes at least one capacitor 210 and at least one inductor, shown as working coil 220. The working coil 220 can be positioned under pot 30 to create an alternating magnetic field and transfer energy to the pot 30.

In general, during operation, a capacitance of the tank circuit 132 does not change. For example, in a heated well application (e.g. food warmer, buffet warmer, chafing dish), the load provided by each pot 30 is fixed. However, the effective inductance of each working coil 220 may change due to movement of the pot 30 and/or due to the presence of a different number, type, or configuration of cooking vessels. A change in the inductance of the tank circuit 132 changes the resonant frequency of the tank circuit 132. Furthermore, if driven at a static resonant frequency, the effective impedance of the tank circuit 132 increases in response to an increase in inductance. For example, at a given frequency, a larger impedance results in a larger current through the tank circuit 132. The power delivered to the pot 30 depends primarily on the current delivered to the tank circuit 132. For example, the power delivered to the pot 30 may be increased by controlling the output frequency of the power inverter 140 and/or by controlling the impedance of the tank circuit 132. The current in the tank circuit 132 depends primarily on the switching frequency of the AC power source 200 (e.g., power inverter 140) with respect to the overall resonant frequency of the tank circuit 132. The current flowing in any one branch of the tank circuit 132 depends on the individual impedance of the branch with respect to the overall impedance of the tank circuit 132.

The current through each branch of the tank circuit 132 is inversely proportional to the impedance of the working coil 220 and series resistance.

$$i_{coil} \propto \frac{1}{z}$$
$$|Z| = \sqrt{R^2 + 2\pi L^2}$$

Figure 5:
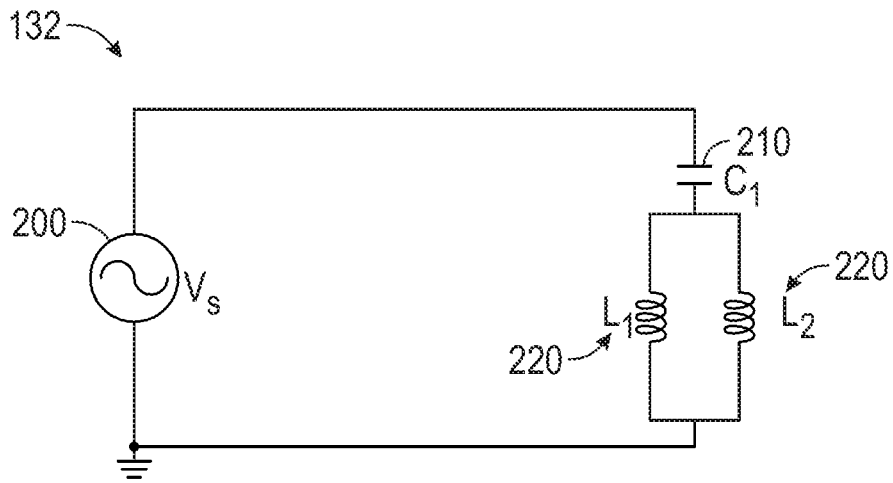
FIG. 5 is the tank circuit of FIG. 4 having two parallel inductors, according to an exemplary embodiment.
Figure 6:
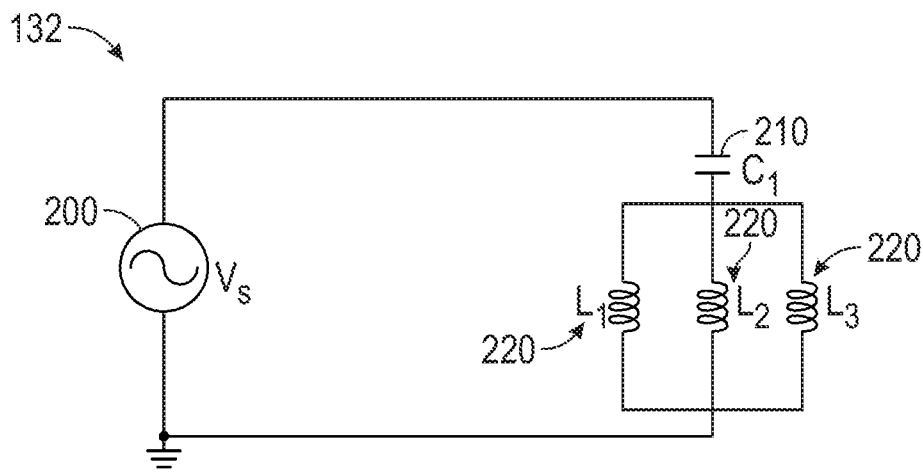
FIG. 6 is the tank circuit of FIG. 4 having three parallel inductors, according to an exemplary embodiment.
Figure 7:
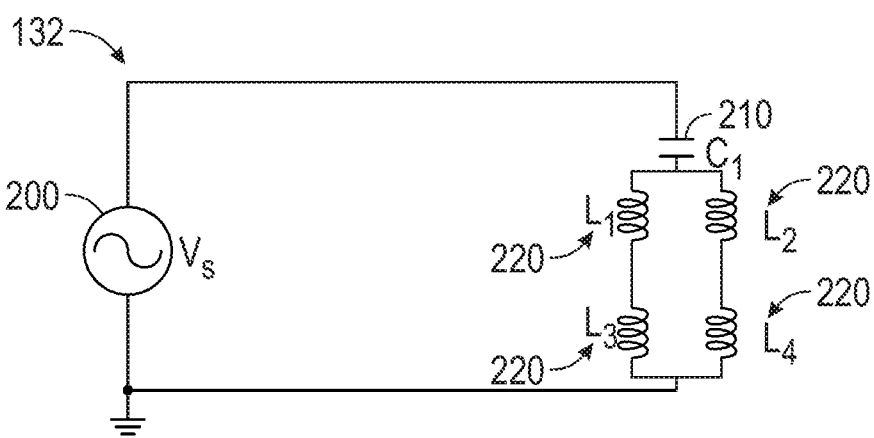
FIG. 7 is the tank circuit of FIG. 4 having two parallel sets of two series inductors, according to an exemplary embodiment.
Figure 8:
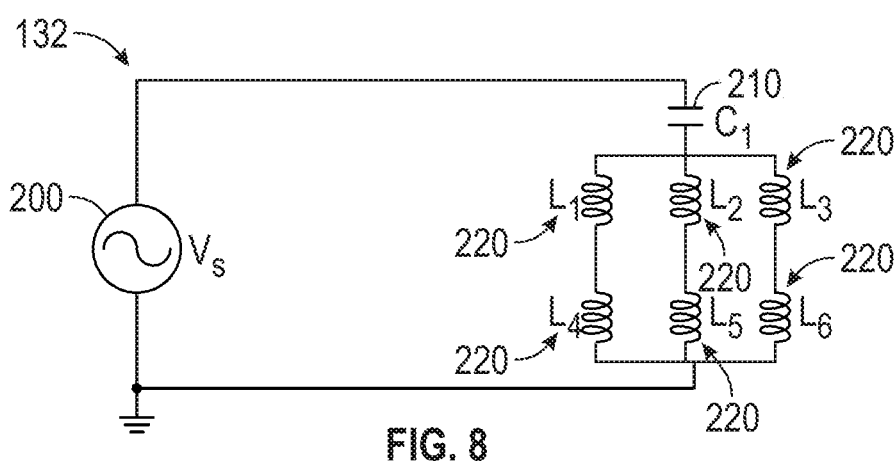
FIG. 8 is the tank circuit of FIG. 4 having three parallel sets of two series inductors, according to an exemplary embodiment.

As shown in the above equation, by controlling the impedance of the working coil and series resistance (e.g., the impedance of each parallel branch), the current flowing through the working coil is controlled, thereby controlling the power delivered to the pot 30. The current through each working coil 220 may be controlled by connecting each working coil 220 in parallel with one or more other working coils 220. For example, the working coil 220 may be in parallel with one other working coil 220, as shown in FIG. 5. Additionally or alternatively, the working coil 220 may be in parallel with two other working coils 220, as shown in FIG. 6. Additionally or alternatively, the working coil 220 may be series with one or more other working coils 220 and the combination may be in parallel with one or more other series combinations of working coils 220, as shown in FIGS. 7-8. For example, a tank circuit 132 may have two parallel branches of two series working coils 220. Parallel combinations of working coils 220 may be modeled by a series equivalent by calculating the effective inductance of the parallel combination of working coils 220.

$$L_{total} = \frac{1}{\frac{1}{L_1} + \frac{1}{L_2} + \ldots \frac{1}{L_n}}$$

Figure 4:
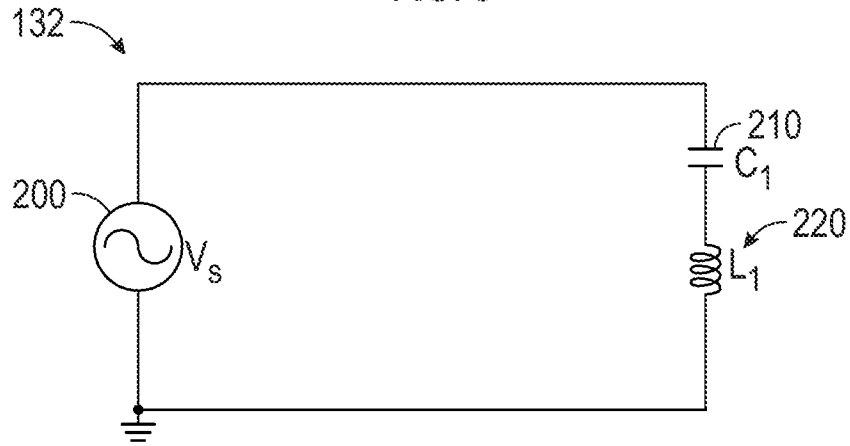
FIG. 4 is a circuit diagram of the tank circuit of FIG. 3, according to an exemplary embodiment.
Figure 9:
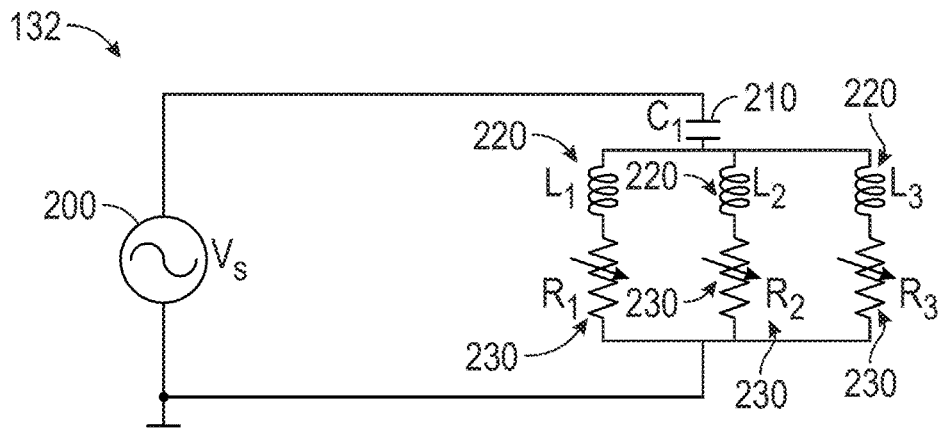
FIG. 9 is the tank circuit of FIG. 4 having three parallel sets of one variable resistor in series with one inductor, according to an exemplary embodiment.
Figure 10:
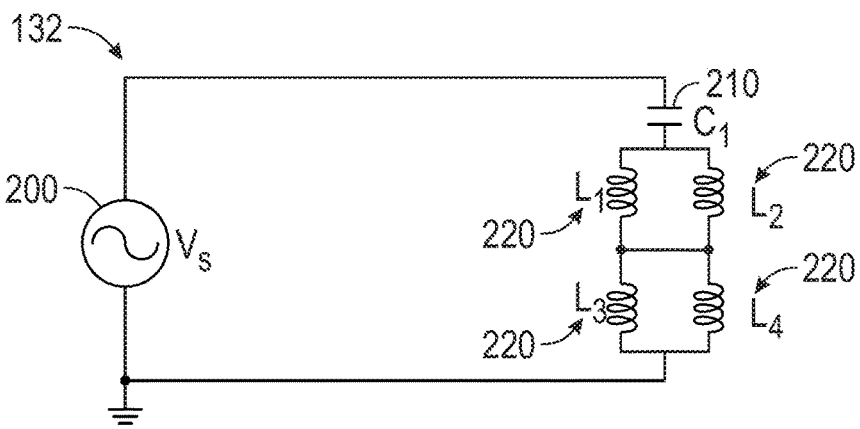
FIG. 10 is the tank circuit of FIG. 10 having two series sets of two parallel inductors, according to an exemplary embodiment.

As shown in the above equation, FIGS. 5-8 may be simplified to an equivalent series circuit in the form of FIG. 4 by calculating the parallel and series equivalent inductances. Additionally or alternatively, each parallel branch may include a variable resistor 230 in series with the working coil 220, as shown in FIG. 9. Adjusting the variable resistor 230 controls the current flowing through the working coil 220 in each parallel branch. In some embodiments, the working coil 220 is in parallel with one or more other working coils 220 and the parallel combination is in series with one or more other parallel combinations of working coils 220, as shown in FIG. 10. It should be understood that other combinations of series and parallel working coils 220 are possible other than those explicitly depicted herein and that the exemplary embodiments are in no way limiting to the number and/or combination of working coils 220.

The inductance of each working coil 220 is primarily determined by the number of windings of the working coil 220. In general, the working coil 220 with the largest number of windings will have the largest inductance and will provide the greatest heat output to the pot 30. In some embodiments, the inductance of each working coil 220 is the same and/or similar. Additionally or alternatively, the inductance of each working coil 220 may be different and may provide different heating patterns. Further, in some embodiments, the inductance of each working coil 220 may be tuned (i.e., changed or adjusted) to achieve different heating patterns or temperatures with a single working coil 220. Changing a sizing (i.e., an inductance) of working coil 220 allows for control of the power transferred from the working coil 220 to the pot 30. Additionally or alternatively, the power transferred from the working coil 220 to the pot 30 may be controlled by adjusting a distance between the working coil 220 and the pot 30, as shown in FIG. 13.

An illustrative example, based on FIG. 8, of inductance sizing is as follows. Two series 100 uH working coils 220 are connected in three parallel branches, making for six working coils 220. The working coils 220 are connected in series with a 700 nF capacitor 210. Accordingly, the operating frequency (i.e., resonant frequency) of the circuit is approximately 23 kHz.

Figure 11:
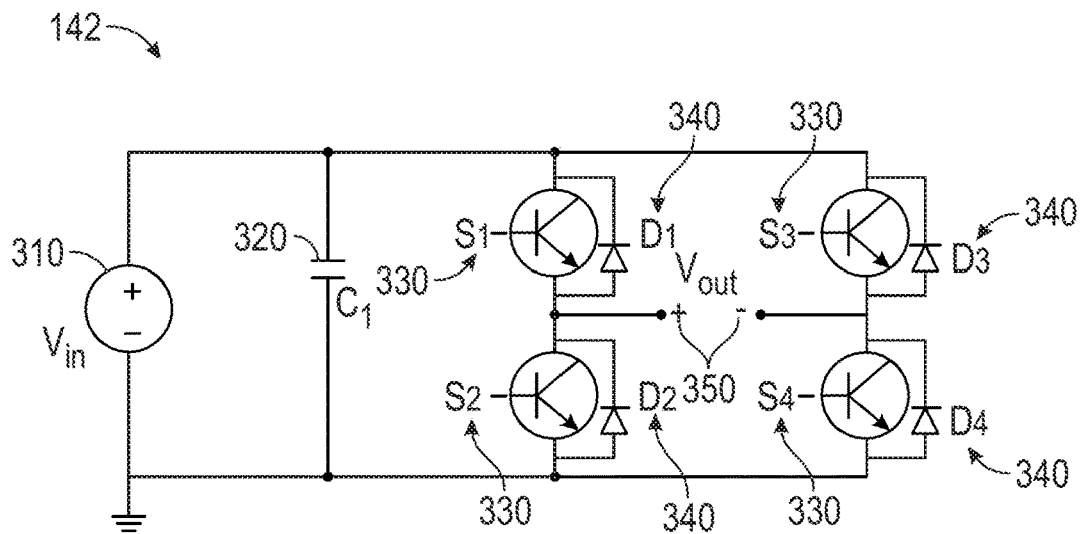
FIG. 11 is the resonant inverter of FIG. 3, according to an exemplary embodiment.

Referring now to FIG. 11, resonant inverter 142 is shown, according to an exemplary embodiment. Resonant inverter 142 may receive DC power and generate AC power to power the tank circuit 132. Additionally or alternatively, resonant inverter 142 may convert an AC input to an different AC output. For example, resonant inverter 142 may receive grid power at 120V 60 Hz and produce an output at 10V 23 kHz. In some embodiments, resonant inverter 142 receives DC power from a rectifier circuit (e.g., power adapter) connected to a standard domestic outlet (e.g., mains). Additionally or alternatively, resonant inverter 142 may receive power from a different induction warmer/cooker 100. For example, multiple induction warmer/cookers 100 may be daisy-chained together. In some embodiments, resonant inverter 142 receives power from a battery or other power storage device.

Resonant inverter 142 is a full-bridge inverter. In some embodiments, resonant inverter 142 has a different design and/or configuration. Resonant inverter 142 includes power source 310, capacitor 320, transistors 330, and diodes 340. Resonant inverter 142 produces output 350 to power the tank circuit 132. In some embodiments, output 350 powers a different device and/or circuit than tank circuit 132. Transistors 330 may be controlled to produce output 350 at a specific frequency (e.g., the resonant frequency of tank circuit 132). Although transistors 330 are shown to be NPN bipolar junction transistors (BJT), it should be understood that transistors 330 may be of any other form (e.g., PNP BJT, FET, JFET, MOSFET, etc.). In various embodiments, control circuit 150 controls transistors 330 to determine operation of the resonant inverter 142.

Figure 12:
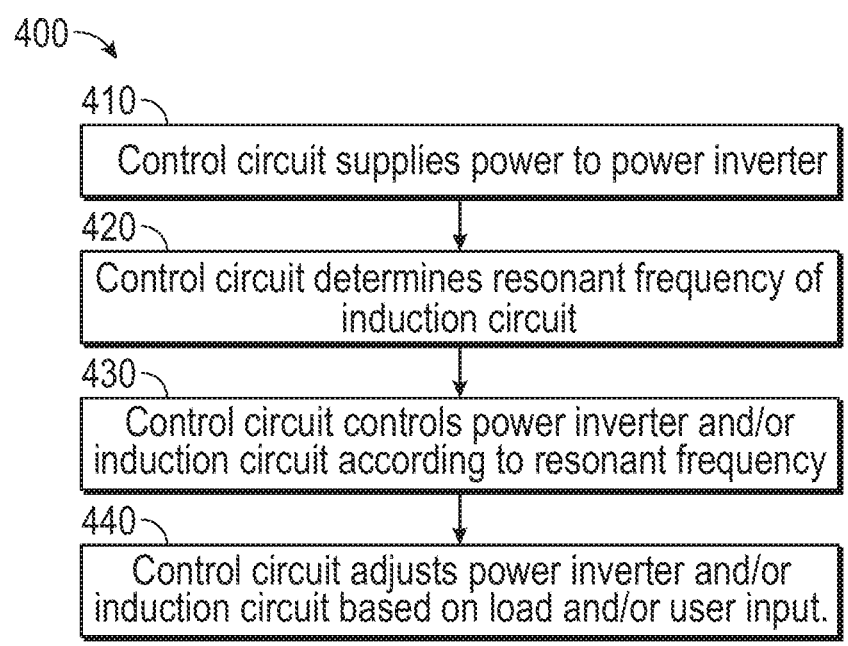
FIG. 12 is a flow diagram of a control method of the control circuit of FIG. 3, according to an exemplary embodiment.

Referring now to FIG. 12, a flow diagram of a control process 400 of the control circuit 150 is shown, according to an exemplary embodiment. At step 410, the control circuit 150 supplies power to the power inverter 140. Step 410 may represent connecting resonant inverter 142 to a power source 310 (e.g., via a switch). At step 420, the control circuit 150 determines a resonant frequency of the induction circuit 130. The control circuit 150 may pulse the tank circuit 132 to determine the resonant frequency of the tank circuit 132. In some embodiments, multiple tank circuits 132 exist and the control circuit 150 determines a resonant frequency for each of the tank circuits 132. Additionally or alternatively, where multiple tank circuits 132 exist, the control circuit 150 may determine which of the tank circuits 132 are in use by measuring an impedance of each of the tank circuits 132. In some embodiments, the control circuit 150 measures the current (e.g., via an ammeter circuit) through tank circuit 132 to determine the resonant frequency of the tank circuit 132. The resonant frequency corresponds to the zero-crossing of the tank circuit 132. The resonant frequency can be determined using the below formula.

$$f_{resonant} = \frac{1}{2\pi\sqrt{LC}}$$

At step 430, the control circuit 150 controls the power inverter 140 and/or the induction circuit 130 according to the determined resonant frequency. For example, the control circuit 150 may control the transistors 330 to produce output 350 at resonant frequency. In some embodiments, control circuit 150 may control multiple power inverters 140 and/or induction circuits 130. For example, control circuit 150 may control a first power inverter 140 to produce a first AC input for a first induction circuit 130 and control a second power inverter 140 to produce a second AC input for a second induction circuit 130. At step 440, the control circuit 440 adjusts the operation of the power inverter 140 and/or the induction circuit 130 based on a load and/or user input. For example, a user may select a different temperature set point and control circuit 150 may adjust a switching frequency of one or more transistors 330 of the power resonant inverter 142 to produce a different AC input for the tank circuit 132, thereby changing the power output of the tank circuit 132 and the temperature set point. Additionally or alternatively, control circuit 150 may adjust operation of the power inverter 140 and/or induction circuit 130 to account for a change in load, as described in detail with reference to FIG. 3.

Multi-Coil Induction Warmer/Cooker

Figure 16:
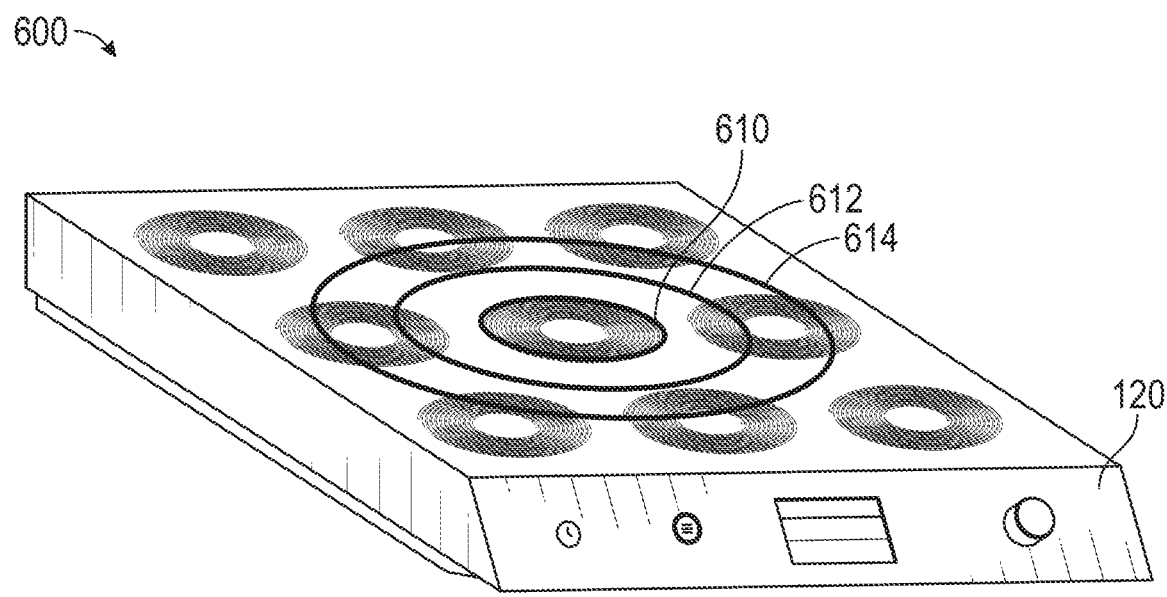
FIG. 16 is the inductive warmer/cooker of FIG. 1 having another cooking surface arrangement, according to an exemplary embodiment.
Figure 17:
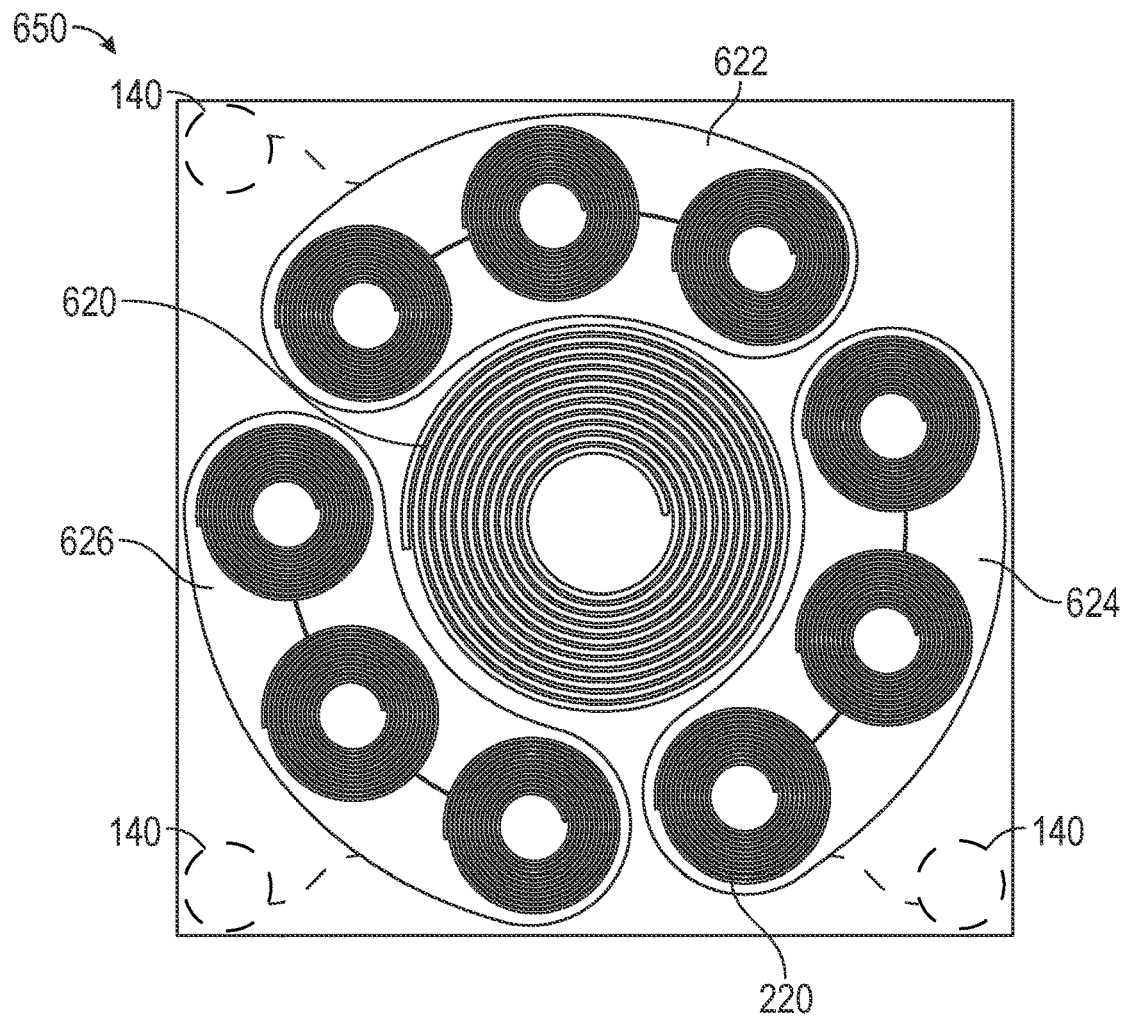
FIG. 17 is a schematic view of the inductive warmer/cooker of FIG. 16, according to an exemplary embodiment.
Figure 18:
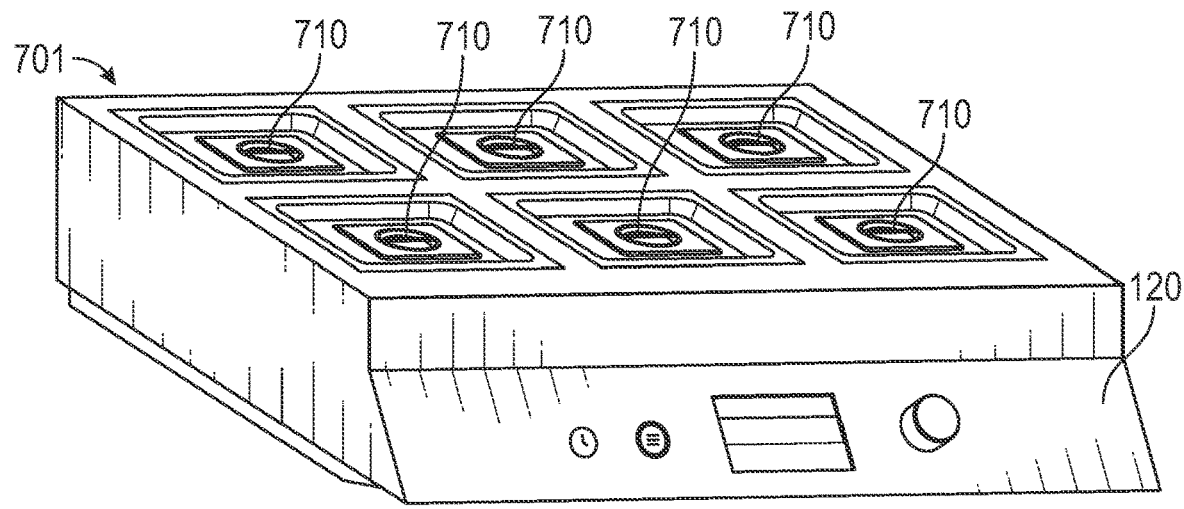
FIG. 18 is a perspective view of the inductive warmer/cooker of FIG. 1 having a chafing dish configuration, according to an exemplary embodiment.

Referring now generally to FIGS. 14-22, various embodiments of induction warmer/cooker 100 are shown, according to some embodiments. The embodiments of FIGS. 14-22 are meant to be illustrative and are not to be taken as limiting to the arrangement, design and/or function of the induction warmer/cooker 100. In some embodiments, induction warmer/cooker 100 may be a used as a warmer. For example, induction warmer/cooker 100 may hold a chafing dish as with a food warmer or a buffet warmer. FIG. 18 shows an induction warmer/cooker 701 for use with chafing dishes 710.

Figure 14:
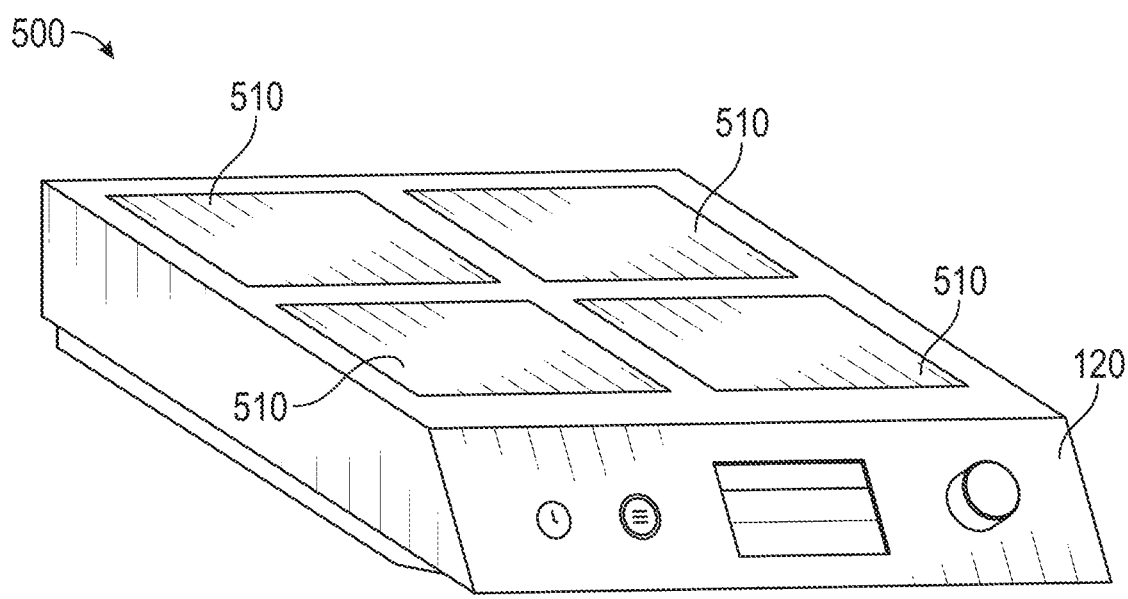
FIG. 14 is the inductive warmer/cooker of FIG. 1 having a 2×2 cooking surface arrangement, according to an exemplary embodiment.
Figure 15:
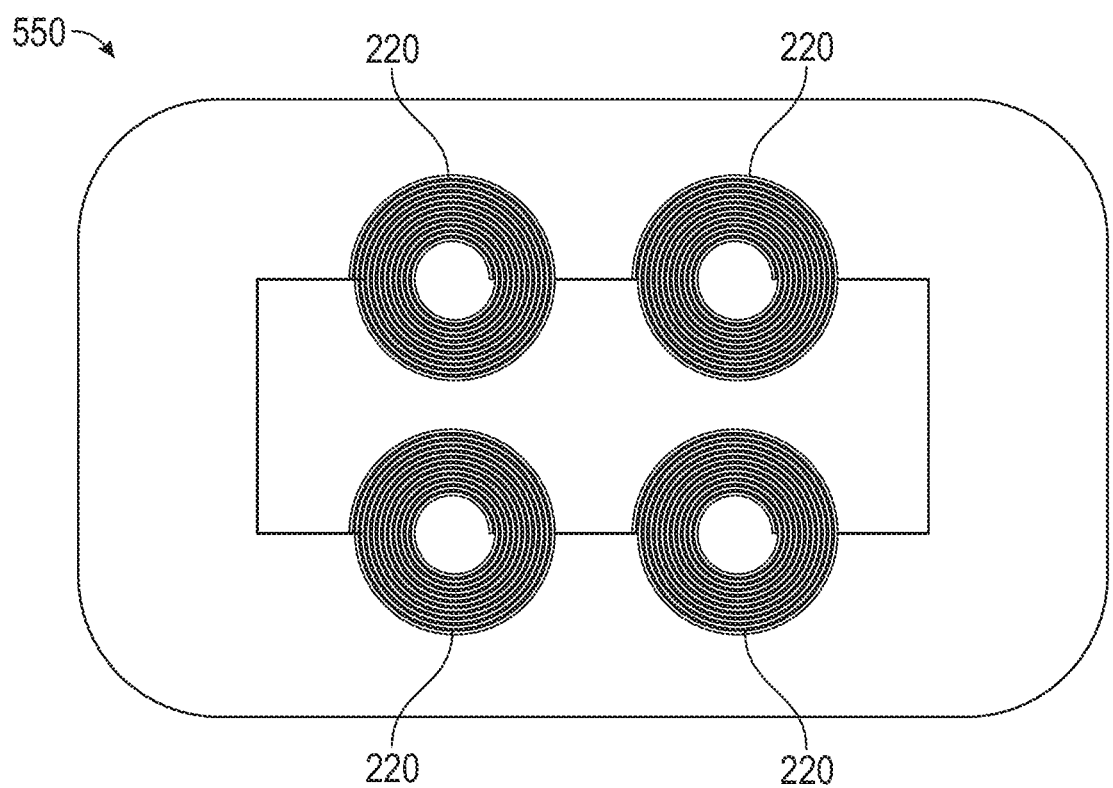
FIG. 15 is a schematic view of the inductive warmer/cooker of FIG. 14, according to an exemplary embodiment.

Referring now to FIGS. 14-15, a multi-coil induction warmer/cooker 500 is shown, according to an exemplary embodiment. The multi-coil induction warmer/cooker 500 may have any of the features described above. Multi-coil induction warmer/cooker 500 may be used to heat and/or cook food via an induction cooking vessel as described above. Multi-coil induction warmer/cooker 500 is shown to include four induction elements 510. In some embodiments, multi-coil induction warmer/cooker 500 includes a different number and/or arrangement of induction elements 510. For example, multi-coil induction warmer/cooker 500 may include a 2×4 array, a 3×3 array, a 4×1 array, or any other combination or arrangement of induction elements 510.

Referring to FIG. 15, an arrangement 550 of working coils 220 is shown, according to an exemplary embodiment. In some embodiments, each induction element 510 corresponds to one working coil 220. In some embodiments, a single power inverter 140 powers a series combination of working coils 220. Additionally or alternatively, multiple power inverters 140 may power one or more groups of working coils 220. Further, in some embodiments, one or more groups and/or branches of working coils 220 exist, as described in detail with reference to FIGS. 4-10. For example, a first power inverter 140 may power a first tank circuit 132 having two parallel combinations of two series working coils 220 while a second power inverter 140 may power a second tank circuit 132 having a single series working coil 220.

Referring now to FIGS. 16-17, an induction warmer/cooker 600 is shown, according to an exemplary embodiment. In some embodiments, the induction warmer/cooker 600 is a French Top induction warmer/cooker. The induction warmer/cooker 600 may have any of the features described above. Induction warmer/cooker 600 may be used to heat and/or cook food via an induction cooking vessel as described above. Induction warmer/cooker 600 may allow for a temperature gradient over the entirety of surface 110. In one embodiment, the induction warmer/cooker 600 includes ten individual working coils 200 with two power inverters 140. Induction warmer/cooker 600 may have multiple heating zones 610-614. Heating zone 610 may be the hottest zone and heating zone 614 may be the coolest zone.

Referring to FIG. 17, an arrangement 650 of working coils 220 is shown, according to an exemplary embodiment. In some embodiments, a first power inverter 140 powers the central working coil 220 and a second power inverter 140 powers the outer working coils 220. The arrangement 650 shows groups 622-626 of working coils 220. In some embodiments, a different grouping and/or arrangement exists. Groups 622-626 each include three series working coils 220. In some embodiments, each group 622-626 include a different number, combination, and/or arrangement of working coils 220. In some embodiments, a single power inverter 140 powers a series and/or parallel combination of the groups 622-626. Additionally or alternatively, multiple power inverters 140 may power groups 622-626 in the same or different configuration (e.g., series/parallel combination). Further, in some embodiments, different power levels and/or frequencies drive groups 622-626 and/or individual working coils 220. For example, group 622 may be powered at 22 kHz while group 624 is powered at 26 kHz.

Figure 19:
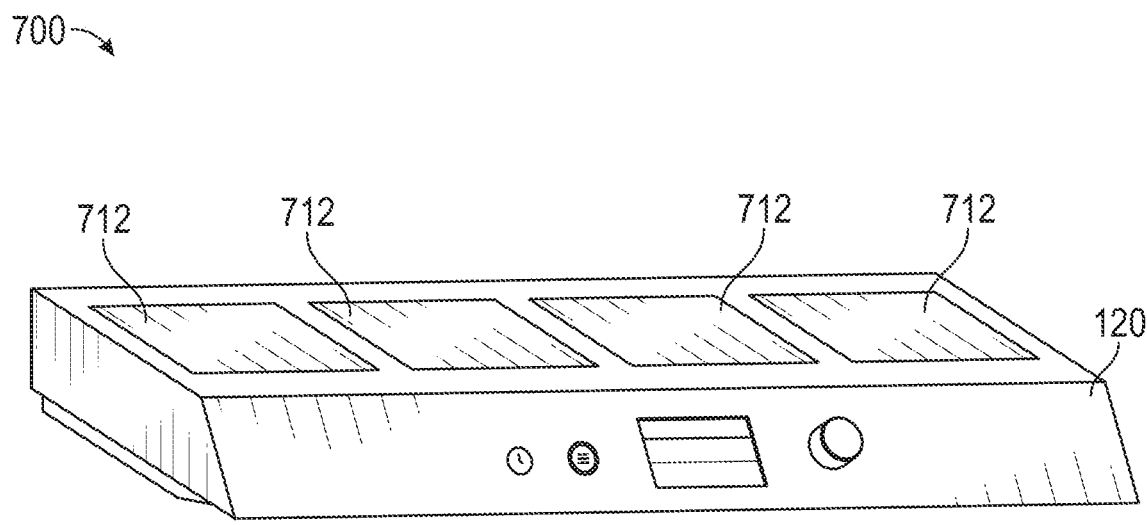
FIG. 19 is a perspective view of the inductive warmer/cooker of FIG. 1 having a 1×4 cooking surface arrangement, according to an exemplary embodiment.
Figure 20:
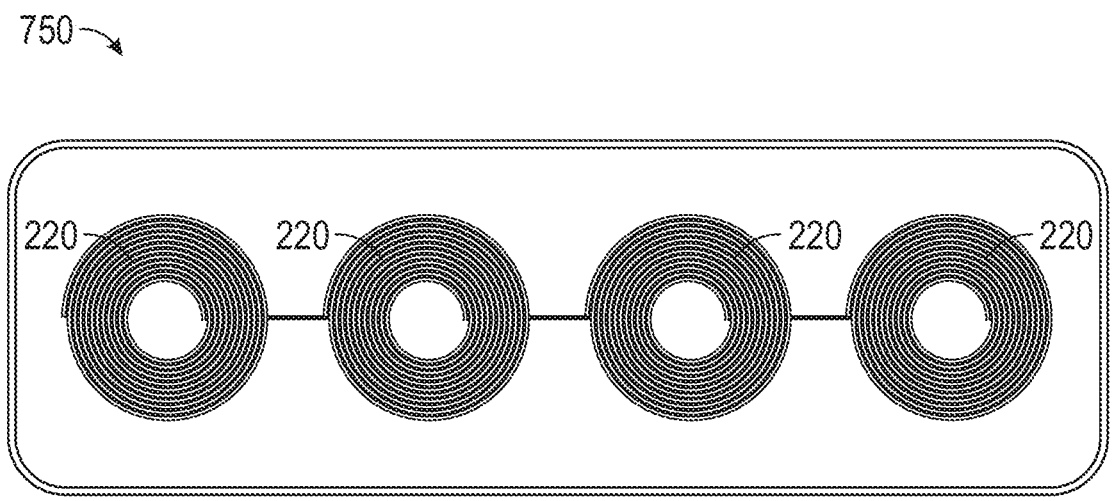
FIG. 20 is a schematic view of the inductive warmer/cooker of FIG. 19, according to an exemplary embodiment.
Figure 21:
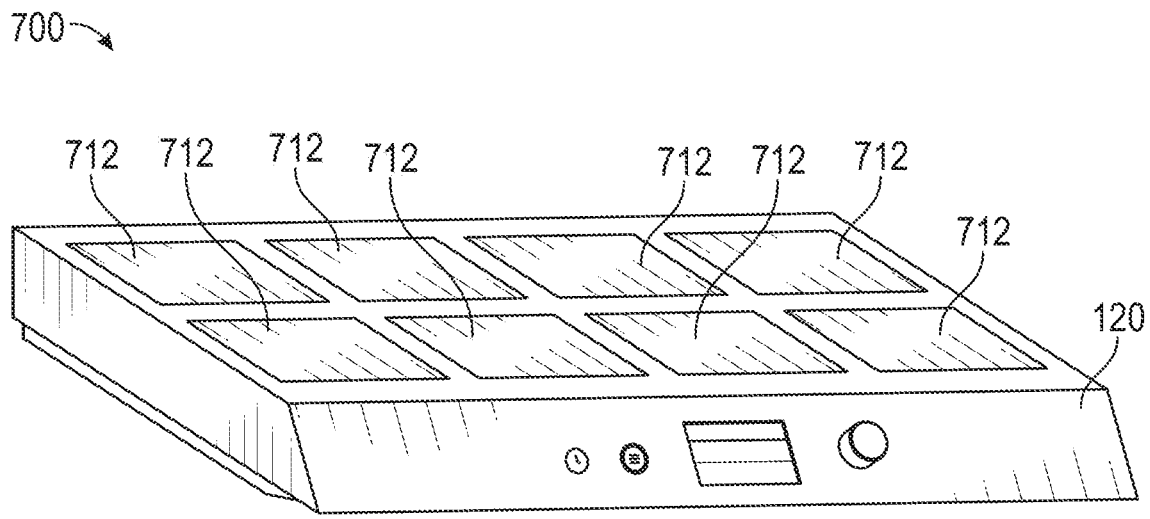
FIG. 21 is a perspective view of the inductive warmer/cooker of FIG. 1 having a 2×4 cooking surface arrangement, according to an exemplary embodiment.

Referring now to FIGS. 19-22, a multi-coil induction warmer/cooker 700 is shown, according to an exemplary embodiment. The multi-coil induction warmer/cooker 700 may have any of the features described above. Multi-coil induction warmer/cooker 700 may be used to warm and/or cook food via an induction cooking vessel as described above. Multi-coil induction warmer/cooker 700 may include a different number and/or combination of induction elements 712. For example, multi-coil induction warmer/cooker 700 may have a 1×4 arrangement of induction elements 712, as shown in FIG. 19. Additionally or alternatively, multi-coil induction warmer/cooker 700 may have a 2×4 arrangement of induction elements 712, as shown in FIG. 21. Other combinations and/or arrangements of inductions elements 712 are possible.

Figure 22:
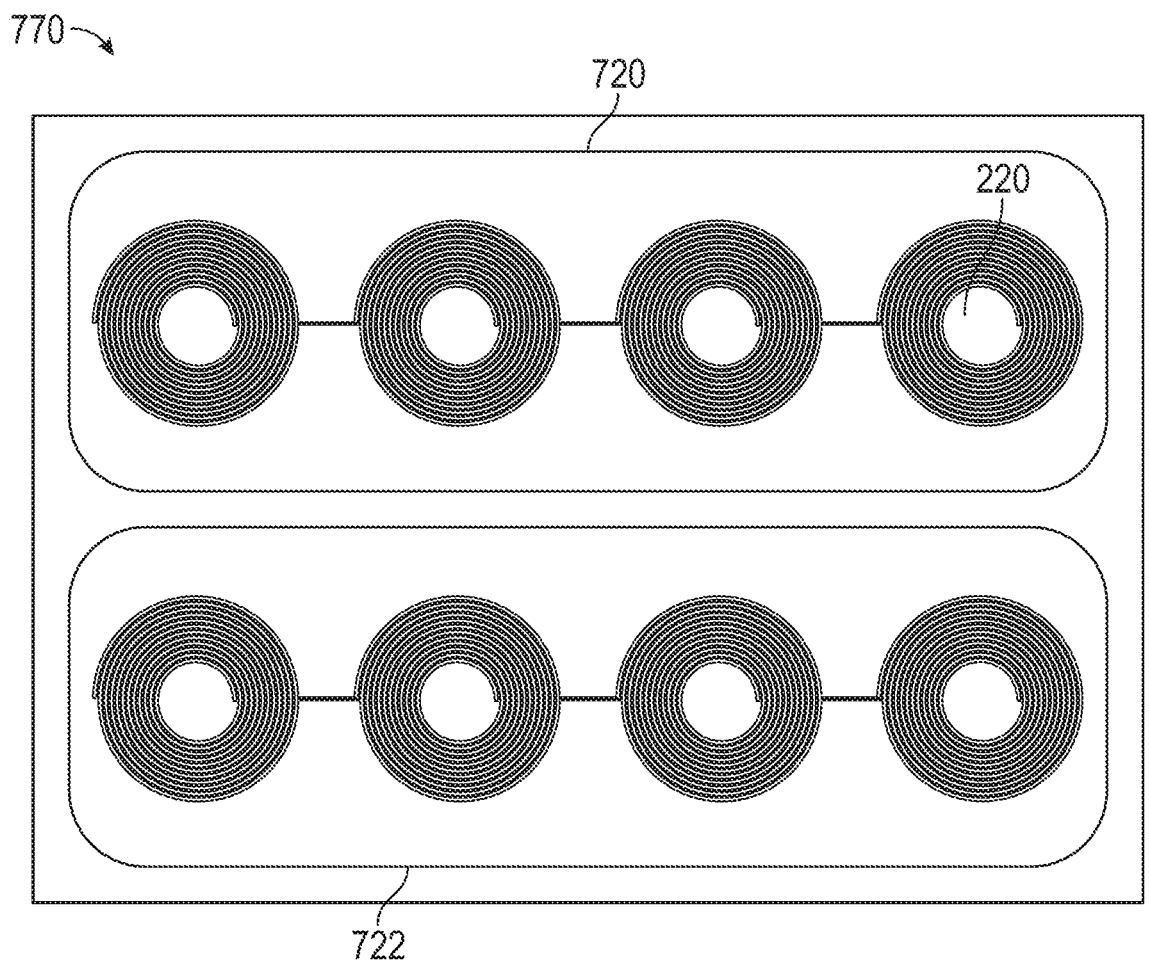
FIG. 22 is a schematic view of the inductive warmer/cooker of FIG. 21, according to an exemplary embodiment.

Referring now to FIG. 20, an arrangement 750 of working coils 220 corresponding to FIG. 19 is shown, according to an exemplary embodiment. Working coils 220 are shown connected in series. However, working coils 220 may be connected in any other arrangement (e.g., two groups of two parallel working coils 220, etc.). Referring to FIG. 22, an arrangement 770 of working coils 220 corresponding to FIG. 21 is shown, according to an exemplary embodiment. Working coils are shown connected in two group of four series working coils 220. However, working coils 220 may be connected in any other arrangement (e.g., one group of eight parallel working coils 220, etc.).

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data that cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of induction warmer/cooker 100 and the components thereof (e.g., the surface 110, the induction circuit 130, the power inverter 140, the control circuit 150, etc.) as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. An induction heating system, comprising:
   a power inverter comprising one or more transistors configured to receive a direct current (DC) input and produce an alternating current (AC) output;
   an induction circuit including a tank circuit comprising at least two working coils arranged in a parallel combination and a capacitor arranged in series with the parallel combination, the induction circuit configured to receive the AC output and produce a magnetic field, wherein the magnetic field interacts with a ferrous material to generate heat in the ferrous material, wherein the parallel combination comprises a plurality of variable resistors, wherein each of the plurality of variable resistors changes between a first resistance and a second resistance, and wherein each of the plurality of variable resistors is arranged in series with a respective one of the at least two working coils; and
   a control circuit comprising a processor and memory coupled to the processor, the memory having instructions stored thereon that, when executed by the processor, cause the control circuit to:
      receive an input, from a user, indicating a temperature set point;
      measure an inductance of the induction circuit;
      determine a resonant frequency of the induction circuit based on the inductance; and
      control the one or more transistors of the power inverter based on the resonant frequency and the temperature set point.

2. The induction heating system of claim 1, wherein the tank circuit comprises a first branch and a second branch, the first branch comprising a first working coil powered by a first power inverter, the second branch powered by a second power inverter and comprising a plurality of series sets of two or more series working coils positioned around the first working coil of the first branch.

3. The induction heating system of claim 1, further comprising a surface to hold a cooking vessel, wherein the at least two working coils selectively repositionable between a first position and a second position, the first position located at a first vertical height beneath the surface and the second position located at a second vertical height beneath the surface that is lower than the first vertical height.

4. The induction heating system of claim 1, wherein the induction circuit, the control circuit, and the power inverter are positioned within one or more housings, each of the one or more housings having a top, wherein the top includes at least one of stone, porcelain, glass, ceramic, metal, or metal alloy.

5. An induction heating system, comprising:
   a housing;
   a heating surface coupled to the housing;
   a first power inverter disposed within the housing;
   a second power inverter disposed within the housing;
   an induction circuit disposed within the housing, the induction circuit including:
      a first working coil positioned at a center of the heating surface, the first working coil electrically coupled to the first power inverter; and
      a plurality of second working coils positioned variously around the first working coil to define a ring of coils around the first working coil, the plurality of second working coils electrically coupled to the second power inverter;
      wherein the induction circuit is configured to receive power from the first power inverter and the second power inverter to produce a plurality of magnetic fields that interact with a ferrous material positioned on top of or in the heating surface to generate heat in the ferrous material;

wherein the first working coil and the plurality of second working coils define a plurality of heating zones across the heating surface including at least a first heating zone positioned above the first working coil, a second heating zone positioned above and between the first working coil and the ring of coils, and a third heating zone positioned above the ring of coils;

wherein the induction circuit includes a tank circuit comprising at least one capacitor and a parallel combination of the plurality of second working coils; and wherein the parallel combination of the plurality of second working coils comprises a variable resistor that changes between a first resistance and a second resistance; and a control circuit comprising a processor and memory coupled to the processor, the memory having instructions stored thereon that, when executed by the processor, cause the control circuit to (i) control the first power inverter to operate the first working coil to provide a first output and (ii) control the second power inverter to operate the plurality of second working coils to provide a second output that is less than the first output such that the induction circuit facilitates providing a temperature gradient across the plurality of heating zones that is greatest proximate the center of the heating surface and the least proximate an edge of the heating surface to facilitate differentially heating cooking vessels positioned at different locations on the heating surface.

6. An induction heating system, comprising:
a housing;
a heating surface coupled to the housing;
a first power inverter disposed within the housing;
a second power inverter disposed within the housing;
an induction circuit disposed within the housing, the induction circuit including:
    a first working coil positioned at a center of the heating surface, the first working coil electrically coupled to the first power inverter; and
    a plurality of second working coils positioned variously around the first working coil to define a ring of coils around the first working coil, the plurality of second working coils electrically coupled to the second power inverter;

wherein the induction circuit is configured to receive power from the first power inverter and the second power inverter to produce a plurality of magnetic fields that interact with a ferrous material positioned on top of or in the heating surface to generate heat in the ferrous material; and wherein the first working coil and the plurality of second working coils define a plurality of heating zones across the heating surface including at least a first heating zone positioned above the first working coil, a second heating zone positioned above and between the first working coil and the ring of coils, and a third heating zone positioned above the ring of coils;

a control circuit comprising a processor and memory coupled to the processor, the memory having instructions stored thereon that, when executed by the processor, cause the control circuit to (i) control the first power inverter to operate the first working coil to provide a first output and (ii) control the second power inverter to operate the plurality of second working coils to provide a second output that is less than the first output such that the induction circuit facilitates providing a temperature gradient across the plurality of heating zones that is greatest proximate the center of the heating surface and the least proximate an edge of the heating surface to facilitate differentially heating cooking vessels positioned at different locations on the heating surface;

wherein the second power inverter includes a plurality of second power inverters, wherein the plurality of second working coils are grouped into a plurality of subsets of second working coils positioned in the ring of coils, wherein each of the plurality of subsets of second working coils includes two or more second working coils arranged in series, and wherein a respective one of the plurality of second power inverters is electrically coupled to a respective one of the plurality of subsets.

* * * * *